United States Patent [19]

Jacobs

[11] 4,271,361
[45] Jun. 2, 1981

[54] ARSENIC ACTIVATION NEUTRON DETECTOR

[75] Inventor: Eddy L. Jacobs, Albuquerque, N. Mex.

[73] Assignee: The United States of America as represented by the United States Department of Energy, Washington, D.C.

[21] Appl. No.: 115,867

[22] Filed: Jan. 28, 1980

[51] Int. Cl.$^3$ ............................................. G01T 3/00
[52] U.S. Cl. ............................................. 250/390
[58] Field of Search ............ 250/361 R, 367, 368, 250/370, 390, 391, 392, 270

[56] References Cited

U.S. PATENT DOCUMENTS

| | | | |
|---|---|---|---|
| 2,697,181 | 12/1954 | Sheldon | 250/390 |
| 2,799,780 | 7/1957 | Ruderman | 250/390 |
| 3,011,056 | 11/1961 | Gale | |
| 3,129,329 | 4/1964 | Love et al. | |
| 3,415,989 | 12/1968 | Leventhal et al. | |
| 3,832,550 | 8/1974 | Bartlett et al. | 250/358 |
| 3,885,153 | 5/1975 | Schoenborn et al. | 250/390 |
| 3,896,306 | 7/1975 | Becker et al. | 250/392 |
| 3,898,466 | 8/1975 | Kawashima | 250/390 |
| 3,942,013 | 3/1976 | Lawson et al. | 250/391 |
| 3,960,756 | 6/1976 | Noakes | 250/367 |
| 3,988,586 | 10/1976 | Stuart et al. | 250/367 |
| 4,086,490 | 4/1978 | Todt | 250/385 |

OTHER PUBLICATIONS

V. D. Dyatlov et al., "Activation Detectors for Recording Pulsed Fluxes of Fast Neutrons", Preprint K-0336, NIIEFA, Leningrad, 1977, pp. 1-20.

*Primary Examiner*—Alfred E. Smith
*Assistant Examiner*—Janice A. Howell
*Attorney, Agent, or Firm*—George H. Libman; Dudley W. King; Richard G. Besha

[57] ABSTRACT

A detector of bursts of neutrons from a deuterium-deuteron reaction includes a quantity of arsenic adjacent a gamma detector such as a scintillator and photomultiplier tube. The arsenic is activated by the 2.5 Mev neutrons to release gamma radiation which is detected to give a quantitative representation of detected neutrons.

8 Claims, 2 Drawing Figures

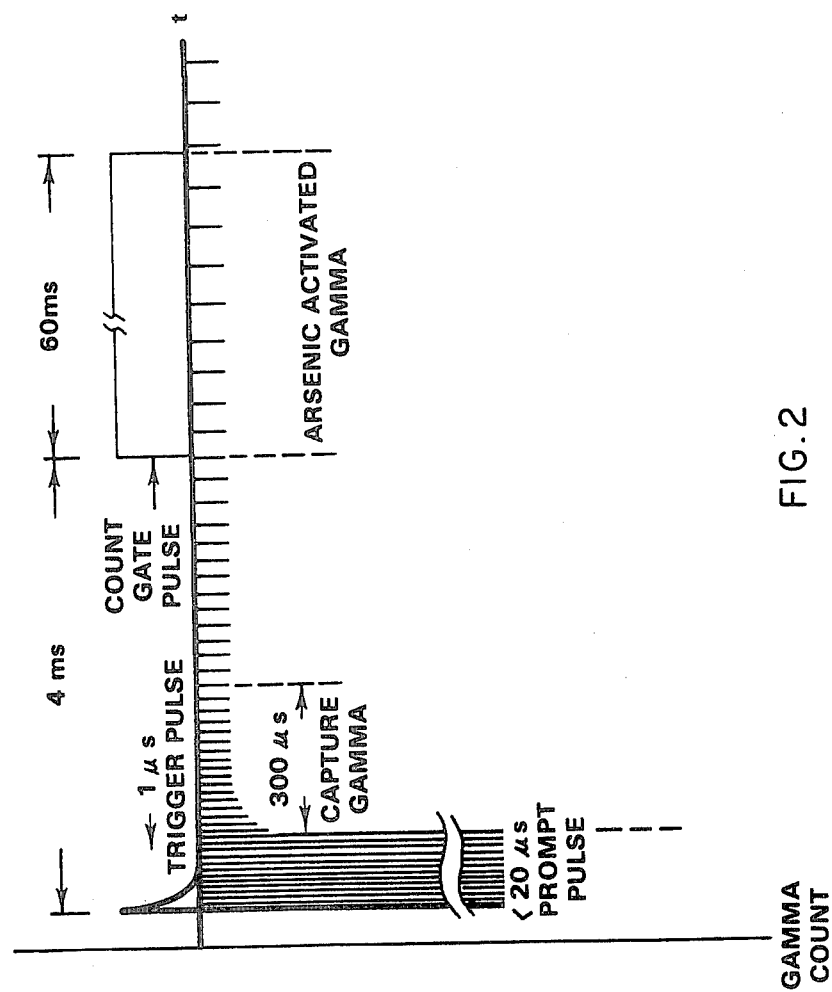

ARSENIC ACTIVATION NEUTRON DETECTOR

BACKGROUND OF THE INVENTION

The present invention relates generally to neutron detectors and more particularly to an arsenic activated detector of fast neutrons, including those emitted by a pulsed deuterium, deuteron reaction. The United States Government has rights in this invention pursuant to Contract No. DE-AC04-76DP00789 between the Department of Energy and Sandia Corporation.

The energy level of neutrons is considered in the design of a neutron detector. Neutrons produced by the bombardment of nuclei with energetic ions or charged particles generally have energies greater than one million electron volts (1 Mev) and velocities of the order of $10^7$ m/sec. A these neutrons pass through matter, energy is transferred from the neutrons to the nuclei with which they collide and, unless they are absorbed in a nuclear reaction, the neutrons gradually slow down. When their average kinetic energy is reduced to the energy of the atoms of the matter, approximately 0.025 ev at room temperature, the neutrons have a velocity of about 2200 m/sec and are designated as "thermal neutrons." Neutrons having energies greater than approximately 0.1 Mev are "fast neutrons" while those with energies less than approximately 1 ev are "slow neutrons." A material used to reduce the speed and energy of neutrons is a "moderator." Materials with low atomic numbers, such as hydrogen, are especially effective as moderators.

The instant invention detects the outputs of pulsed neutron generators. One such neutron generator bombards deuterium with deuterons to produce a helium isotope and neutrons having an energy of approximately 2.5 Mev. This reaction is commonly denoted as either $D(d,n)^3He$ or DD. Another such generator bombards tritium with deuterons to produce stable helium and neutrons having an energy of approximately 14 Mev. This reaction is denoted either $T(d,n)^4He$ or DT.

U.S. Pat. No. 4,090,083 discloses a detector of neutrons from a continuous generator such as a nuclear reactor. This detector uses a thermal-neutron-responsive activated scintillator to actuate a photomultiplier tube. The fast neutrons generated by the reactor are slowed by a moderator in order that they may be detected by the scintillator. A detector of this type is not believed to have sufficient sensitivity to satisfactorily measure the output of a pulsed DD or DT reaction, and its accuracy is seriously compromised by neutron scattering and moderation by materials in the vicinity of the neutron generator or detector.

R. Lanter and D. Bannerman described in *Rev. Sci. Inst.*, Vol. 39, No. 10, October 1968, p. 1588, a silver counter that was, for several years, the secondary standard for measuring the output of the DD and DT pulsed neutron generators. (A secondary standard is a transfer device which is calibrated against a primary standard). This counter uses a Geiger tube wrapped in silver foil and embedded in a block of polyethylene. In operation, the generated fast neutrons are slowed by the polyethylene moderator to thermal energy levels. The thermal neutrons activate two isotopes of silver, $^{107}Ag$ and $^{109}Ag$, to produce beta particles which are detected by the Geiger tube. Because of the multiple, long-half-life (2.4 minutes, 24 seconds) of the radioisotopes involved in the reactions, the silver counter is slow and inconvenient to use; the operator, typically, having to wait 6 minutes for the counter to decay from the previous measurement before a subsequent measurement can be made without compensation. In addition, the response of the silver counter to low energy neutrons makes it susceptible to errors from neutron scattering and moderation.

A lead counter developed to replace the silver counter as the secondary standard for DT neutron measurements is described by C. Spencer and E. Jacobs, *IEEE Trans. Nucl. Sci.*, Vol. NS-12, 1965, p. 407. This counter uses a $\frac{3}{4}$ inch thick lead jacket over a plastic scintillator that is observed by an end-window photomultiplier tube. In operation, high energy neutrons exceeding the reaction threshold of the lead activate the lead which decays by gamma emission. The scintillator and photomultiplier detect the gamma radiation by standard techniques. The 800 ms half-life of the lead isotope permits a measurement to be made within 20 seconds of the previous measurement without affecting its results. Although the 1.6 Mev threshold of one of the lead isotopes, $^{107}Pb$, is low enough to be activated by 2.5-Mev DD neutrons, the sensitivity of lead to this energy is deemed too low to give an accurate count of these neutrons.

SUMMARY OF THE INVENTION

It is an object of this invention to provide a secondary standard for measuring the output of pulsed DD and DT neutron generators.

It is also an object of this invention to provide a neutron detector having a short count interval.

It is another object of this invention to provide a neutron detector with a high measurement repetition rate.

It is a further object of this invention to provide a neutron detector which responds only to high-energy neutrons.

It is still another object of this invention to provide a neutron detector which is easily and reliably calibrated.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the neutron detector of this invention may comprise a layer of arsenic positioned adjacent a gamma detector. The gamma detector may preferably comprise a plastic scintillator and photomultiplier tube.

The neutron detector of this invention provides a secondary standard for measuring neutrons from either a DD or DT reaction. Because of the short half-life of the arsenic isotopes involved in the measurement technique, measurements are repeatable within 0.1 second. With additional circuitry, this detector is capable of several other accurate measurements from a single neutron pulse.

BRIEF DESCRIPTION OF THE DRAWINGS

The accompanying drawings, which are incorporated in and form a part of the specification, illustrate an embodiment of the present invention and, together with the description, serve to explain the principles of the invention.

FIG. 2 shows a typical waveform generated by the invention.

DETAILED DESCRIPTION OF THE INVENTION

Figure 1:
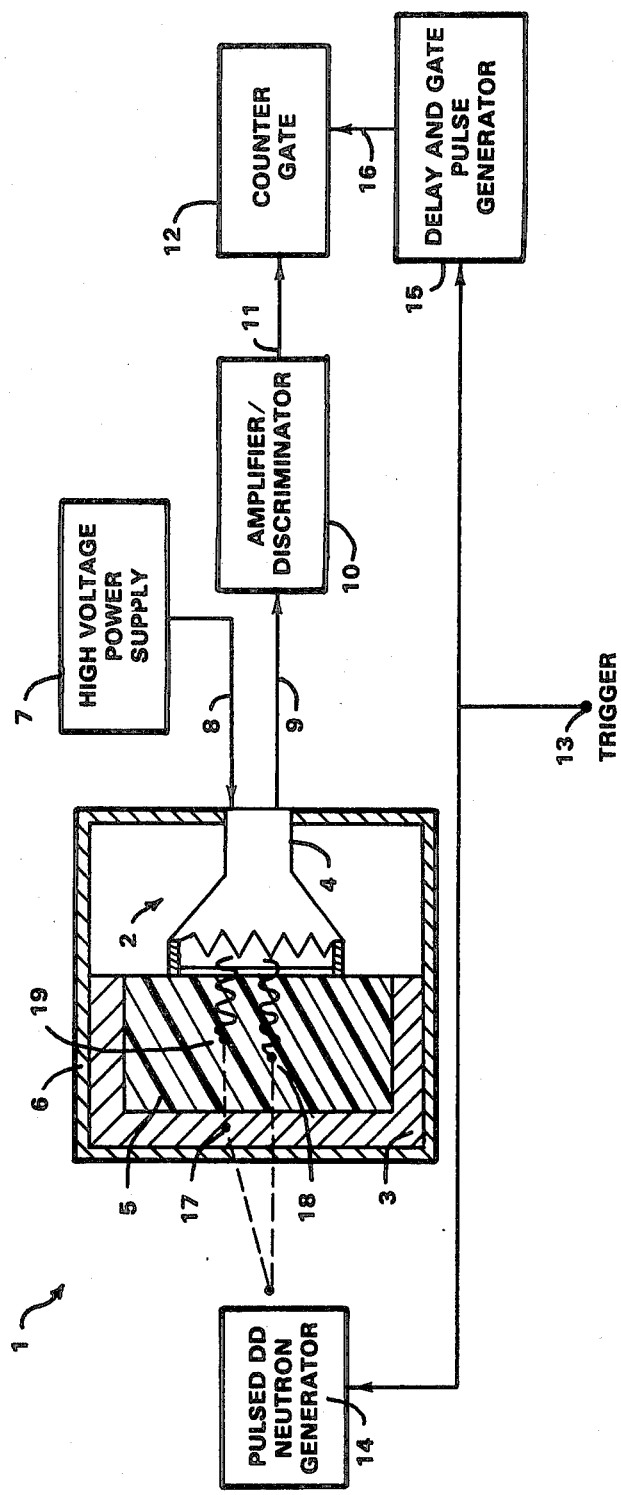
FIG. 1 shows a block diagram of the invention.

It has been discovered that the $^{75}As(n,n')^{75m}As$ reaction, which has been known to emit a 0.3 Mev gamma with 17 ms half-life when activated with neutrons having an energy greater than 7 Mev, will emit sufficient gammas for a detection when activated with 2.5 Mev neutrons from a DD reaction. Accordingly, an embodiment of the invention as illustrated in FIG. 1 was constructed and operated.

As shown in FIG. 1, neutron detector 1 includes gamma detector 2 adjacent a layer 3 of arsenic activator. In this embodiment gamma detector 2 includes photomultiplier tube 4 and scintillator 5. In a particular example of this embodiment, photomultiplier tube 4 is an EMI-9791, a five inch diameter, flat-face, end-window phototube and scintillator 5 is an 8 inch diameter by 4 inch thick piece of polyvinyltoluene or polystyrene, which is commercially available as Pilot B or NE 102 plastic scintillator material (Nuclear Enterprises Company). Of course, any gamma detector with sufficient sensitivity to detect the output of the arsenic as herein described, such as a sodium iodide or liquid scintillator, may be used in the practice of this invention.

Since arsenic is a lumpy, crystalline material which is not amenable to mechanical forming techniques such as casting, layer 3 was formed by mixing powdered arsenic and epoxy into a 1 inch thick shell shown partially encasing scintillator 5. The front of the scintillator was covered by a mixture of arsenic and epoxy in the following ratio: 100 gms Shell 815 resin, 35 gms T403 hardener, 1.75 gms 398 accelerator and 600 gms 30-mesh arsenic powder. The side of the scintillator was covered by a mixture of the same epoxy with 500 gms arsenic powder. The total arsenic content for this shell was about 7 kg.

Layer 3 could also be constructed by packing arsenic into a hollow form constructed of a material such as plastic, steel, or other material which does not react adversely with either neutron or gamma radiation.

Layer 3 may be of any desired dimensions as long as it contains a sufficient quantity of arsenic to ensure that a detectable number of neutrons will activate some of the relatively widely spaced arsenic nuclei as discussed hereinafter. The thickness of layer 3 is not required to be uniform throughout its area, although this construction does simplify calibration of the device.

To minimize the versatility of the invention, as will be discussed hereinafter, gamma detector 2 and arsenic 3 are encased in a ¼ inch layer of lead 6.

The electrical circuitry for the operation of the neutron detector is commercially available and includes high voltage power supply 7 connected through conductor 8 to energize photomultiplier 4. Output conductor 9 connects the output of photomultiplier 4 with amplifier/discriminator 10, the output of which is connected through conductor 11 to the input of counter 12. A trigger signal is provided at terminal 13 to energize pulsed DD neutron generator 14 and delay and gate pulse generator 15. The output of gate generator 15 provides, through conductor 16, a gate signal to counter 12.

The following equipment has been used in the practice of this invention: amplifier/discriminator 10, Mech-Tronics Model 511 photon discriminator; counter 12, Ortec Model 772 100 MHz counter; and pulse generator 15, Lecroy Model 222 dual delay and gate module.

In order to better understand the operation of the invention, reference should also be made to FIG. 2 which shows, as a function of time, the trigger pulse applied at 13, an output pulse from generator 15 and the signal on conductor 11 representative of the gamma radiation detected by gamma detector 2.

When a trigger pulse of approximately 1 $\mu$s is applied to terminal 13, a stream of deuterons is accelerated at about 150 kev into deuterium for a duration of several microseconds, causing the release of a prompt pulse of neutrons and X-rays from generator 14. Detector 1 is positioned in the path of the neutrons in order that they will be received by arsenic layer 3. Lead shield 6 is thick enough to prevent the X-rays from penetrating detector 1, but thin enough to not significantly affect the passage of 2.5 Mev neutrons. Most of these neutrons 18 pass through arsenic-containing shell 3 without activation and then enter plastic scintillator 5 where they react directly with the scintillator material to cause proton recoils which excite the scintillator. The photomultiplier output of this activity is indicated in FIG. 2 as the prompt pulse, which has an amplitude proportional to neutron rate and many orders of magnitude larger than the other activity shown in the Figure.

While passing through the arsenic-containing shell, some neutrons 17 activate stable arsenic nuclei to the $^{75m}As$ isomeric state. This isomer decays by emitting gamma radiation with a 17 ms half-life. Depending on the relationship of the arsenic with respect to the neutron source and the scintillator, a portion 19 of the gamma radiation enters the scintillator and is converted to light for detection by the photomultiplier as will be further discussed hereinafter. Sensitivity of the detector to arsenic activation is increased by either increasing the quantity of arsenic or decreasing the separation between the arsenic and the neutron source to maximize the probability that a neutron will activate an arsenic nucleus. The size and density of the scintillator and its proximity to the arsenic can also affect sensitivity.

Although the generation of neutrons ceases with the completion of the prompt pulse, two more stages of activity remain at the detector.

Emission of gamma rays from the activated arsenic begins with the prompt pulse and continues at a steadily decreasing rate until all activated arsenic isomers have decayed. As shown in FIG. 2, due to the 17 ms half-life, most of this activity occurs within 100 ms of the prompt pulse. However, for the first few hundred $\mu$s after the prompt pulse, this arsenic activated activity is overwhelmed by capture gammas resulting from the capture of thermalized neutrons by hydrogen atoms in the scintillator and the subsequent release of capture gamma radiation.

The associated circuitry reacts to the activation of the scintillator in the following manner. Each light scintillation causes the release of electrons from the photocathode of photomultiplier tube 4 which are multiplied until a measurable current pulse is produced. This pulse is transmitted to amplifier/discriminator 10 where it is further amplified and compared with a minimum acceptable signal level. If the pulse is greater than this level, it is considered to be representative of a neutron-induced event rather than background noise and is transmitted to counter 12. Delay and gate pulse generator 15 enables counter 12 as set forth below.

From an inspection of FIG. 2, it is apparent that three different measurements may be taken from the output of the detector of this invention merely by gating counter 12 ON at different times. To count the individual prompt interactions, the counter is activated only during the prompt pulse. This measurement is a reliable indication of the output of the generator only if the neutron output is extremely low such that the individual neutron interactions can be time resolved during the brief neutron generation interval. Typically, the prompt interactions are extremely numerous and their summation results in a current pulse from the photomultiplier which is an analog of the neutron generation rate. Integration of the prompt pulse will yield a quantity which is proportional to the total number of neutrons generated.

To measure the capture gammas, the counter is activated for approximately 300 μs following the end of the prompt pulse. This measurement is a useful indication of very low neutron outputs but its validity is compromised by additional capture gammas originating in the laboratory environment.

A measurement for which this invention is well suited, and which is a good indication of the output of the neutron generator, is a count of the arsenic activation over a period from approximately 4 to 60 ms after the prompt pulse. Initiation of the counting period is chosen to allow capture gamma to subside and the photomultiplier circuitry to recover from the overload caused by the large prompt pulse. Completion of the period is chosen because, after three 17 ms half-lifes, 90% of the available gammas have been counted, and lengthening the count period merely increases extraneous background counts.

It is noted that since a neutron burst is completely detected within 100 ms, subsequent events may be detected every 100 ms without counts from the previous event effecting results.

The configuration described above recorded, when referenced against a silver counter, a sensitivity to DD neutrons of approximately 2000 neutrons/count for a neutron generator to detector spacing of 3 inches. The same system also had a sensitivity to DT (14 Mev) neutrons of 1760 neutrons/count at a spacing of 6 inches. The DT sensitivity is about twice that of a lead counter using the 800 ms $^{207m}$Pb isomer, and the background count is much lower than that obtained with lead.

As noted above, the lead shield 6 is desirable only for measurement of the prompt pulse, as this shield keeps X-rays from interfering with this measurement. The shield may be omitted from a detector intended only for measurement of arsenic-activated gamma radiation.

Calibration of this detector for use as a secondary-standard is accomplished by referencing it against a Cockcraft-Walton accelerator in which the associated protons are counted to give a measure of total neutron yield. The operating sensitivity is thereafter maintained by counting a reference radioactive source (such as $^{133}$Ba) for a specified time in a well-defined position and adjusting the detector sensitivity for the same count obtained immediately after calibration.

The particular sizes and equipment discussed above are cited merely to illustrate a particular embodiment of the invention. It is contemplated that the use of this invention may involve components having different sensitivities and sizes as long as the principle, using arsenic adjacent a gamma detector, is followed. A detector so constructed will provide a sensitive, convenient secondary standard for the measurement of the output of a pulsed DD or DT neutron generator. It is intended that the scope of the invention be defined by the claims appended hereto.

I claim:

1. A neutron detector comprising: a layer of arsenic for receiving fast neutrons and emitting gamma radiation with a half-life of about 17 milliseconds when activated by the fast neutrons; and means positioned adjacent said arsenic layer for detecting and indicating the gamma radiation.

2. The detector of claim 1 wherein said means comprises input means for receiving gamma rays and output means for providing an electrical representation of the gamma rays.

3. The detector of claim 2 wherein said input means consists of a scintillator and said output means comprises a photomultiplier tube.

4. The detector of claim 3 wherein said arsenic layer is adjacent to said scintillator.

5. The detector of claim 4 wherein the thickness of said arsenic layer is substantially uniform across its area.

6. The detector of claim 4 wherein said layer of arsenic comprises a mixture of a binding material and powdered arsenic.

7. The detector of claim 6 wherein said binding material is epoxy.

8. The detector of claim 3 wherein said output means further comprises a pulse-height discriminator connected to the output of said photomultiplier, a triggerable counter connected to the output of said discriminator, and gate means connected to enable said counter for a predetermined period.

* * * * *